United States Patent [19]

Beaumont

[11] Patent Number: 4,461,313
[45] Date of Patent: Jul. 24, 1984

[54] FLUID PRESSURE VALVE

[75] Inventor: Paul Beaumont, Nancyglow, Wales

[73] Assignee: Girling Midland-Ross Air Actuation Limited, Birmingham, England

[21] Appl. No.: 364,971

[22] Filed: Apr. 2, 1982

[30] Foreign Application Priority Data

Apr. 6, 1981 [GB] United Kingdom ............... 8110740

[51] Int. Cl.³ .................................................. F16K 7/17
[52] U.S. Cl. ......................................... 137/102; 137/843
[58] Field of Search ............... 137/102, 107, 852, 854, 137/860, 512.4

[56] References Cited

U.S. PATENT DOCUMENTS

| | | | |
|---|---|---|---|
| 2,669,979 | 2/1954 | Kiekhaefer | 137/512.4 |
| 3,093,153 | 6/1963 | Horowitz | 137/102 |
| 3,424,185 | 1/1969 | Lansky et al. | 137/102 |
| 4,204,555 | 5/1980 | Durling | 137/102 |
| 4,318,809 | 3/1982 | Bethel | 137/512.4 |

FOREIGN PATENT DOCUMENTS

| | | | |
|---|---|---|---|
| 1005325 | 9/1965 | United Kingdom | |
| 2075640 | 11/1981 | United Kingdom | 137/102 |

Primary Examiner—Martin P. Schwadron
Assistant Examiner—James R. Shay
Attorney, Agent, or Firm—Holman & Stern

[57] ABSTRACT

A quick release valve for a vehicle braking system has an inlet port, an outlet port for connection to a brake actuator, and an exhaust port closed during operation of the actuator by a working area of a diaphragm. A support area of the diaphragm surrounding the area has peripheral indents with re-entrant edge portions. Reduction of the support area by formation of the indents lessens noise produced by the valve during exhausting after operation of the brake actuator.

11 Claims, 4 Drawing Figures

U.S. Patent    Jul. 24, 1984    4,461,313
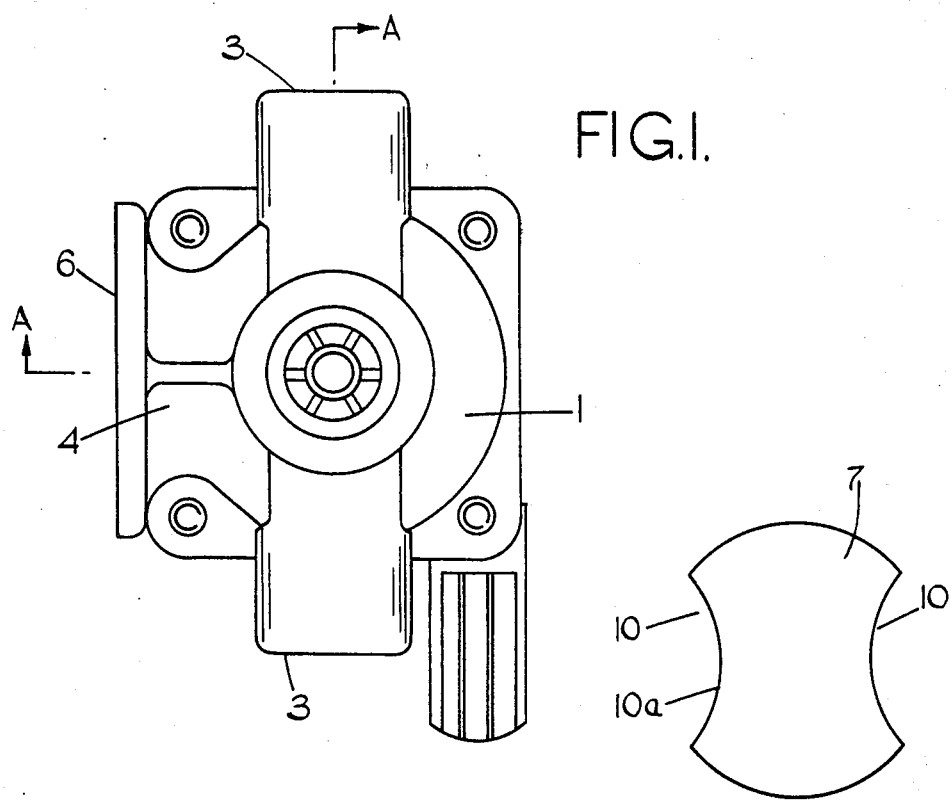
FIG.1.
FIG.3.
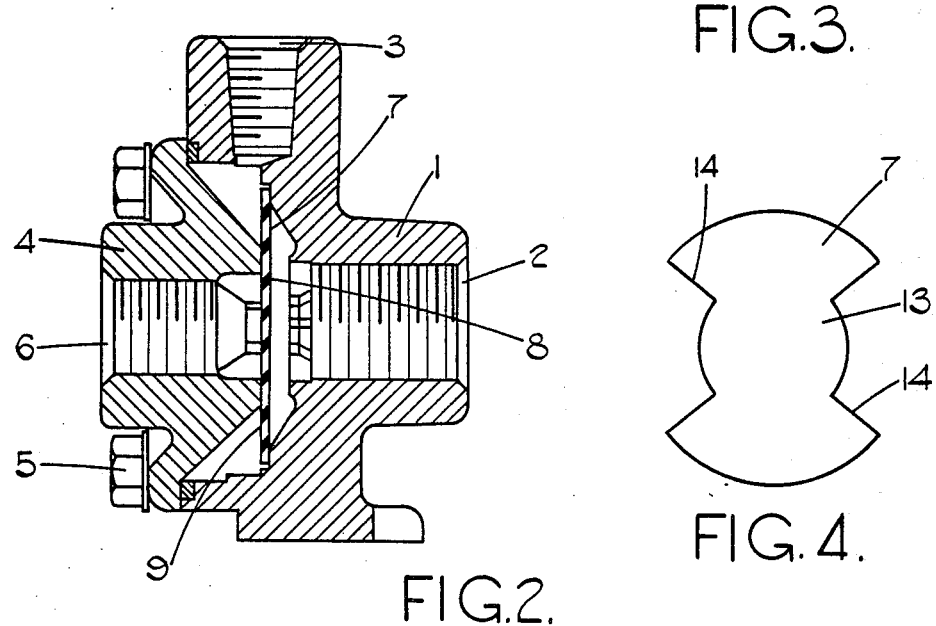
FIG.2.
FIG.4.

FLUID PRESSURE VALVE

BACKGROUND OF THE INVENTION

1. Field of the Invention

This invention relates to a quick release valve, primarily for use in a vehicle braking system to control the flow of actuating fluid under pressure to one or more brake actuators.

2. Description of the Prior Art

Such a valve is employed particularly in pneumatically operated braking systems and operates to permit the rapid decay of braking pressure to atmosphere via an exhaust port when the primary supply pressure is removed after braking i.e. in the "brakes off" condition. A freely movable diaphragm of the valve closes the exhaust port during braking but is moved away from the port by the brake line pressure upon brake release to permit air flow therethrough from the brake line and so cause the aforesaid decay of pressure. Such rapid release valves often give rise, during pressure decay, to loud hissing and other noises due to oscillation of the diaphragm, which is thought to result from an interaction between the inherent resilience of the diaphragm and the falling air pressure in the delivery lines. Such noises can be disconcerting when they occur in close proximity to unsuspecting people, as for example in a crowded street.

BRIEF SUMMARY OF THE INVENTION

An object of the present invention is to provide a quick release valve in which the occurrence of untoward noise during pressure decay is significantly reduced or eliminated.

According to the present invention, a quick release valve is provided with a diaphragm having a working area for co-operation with an exhaust port and a support area outside said working area for engagement with the interior of the valve, the support area being shaped during the initial formation of the diaphragm, and/or by subsequent removal of material from the initially formed diaphragm, to provide at least one indent which forms a re-entrant peripheral edge portion of the diaphragm.

BRIEF DESCRIPTION OF THE DRAWINGS

The invention will now be described, by way of example, with reference to the accompanying drawings wherein:

FIG. 1 is an end elevational view of one form of the valve of the invention;

FIG. 2 is a cross-sectional view taken on the line A—A of FIG. 1; and

FIGS. 3 and 4 are respective plan views of two alternative embodiments of diaphragms for use with the valve of the invention.

DETAILED DESCRIPTION

The valve illustrated in FIGS. 1 and 2 of the drawings is of the type commonly known as a rapid or quick release valve and used extensively in pneumatically operated vehicle braking systems to produce a rapid decay of pressure in the brake lines upon brake release. The valve has a main body 1 having an air inlet 2 which would be connected, in use, to a high pressure air supply, usually in the form of an accumulator under the control of a driver, and a pair of oppositely disposed air outlets 3 connectable to brake pressure delivery lines leading to brake actuators. An additional body portion 4 is bolted to the main body by bolts 5 and defines an exhaust port 6 for the attachment, in use, of an exhaust line. Passage of air through the exhaust port is controlled by a freely floating flexible diaphragm 7 of which a central working area 8 co-operates with the port 6 and a peripheral support area 9 affords support for the diaphragm within the main body. The diaphragm is typically of about 0.050" thickness and of reinforced rubber material.

In one operative condition of the valve, high pressure air admitted through the port 2, by operation of a driver-operated supply valve, forces the diaphragm into the position shown, in which it blocks the exhaust valve, and air is admitted to the brake delivery lines via ports 3. When the supply pressure ceases, pressure in the delivery line urges the diaphragm away from the exhaust port 6 which results in rapid decay of that pressure through the exhaust port.

The valve of the invention is designed to minimize or eliminate the potentially disturbing hiss which accompanies the exhausting of conventional valves. This is achieved by forming indents in the peripheral area of the diaphragm, either during the initial formation of the diaphragm or by subsequent removal of material therefrom, or both to provide cut-outs forming peripheral edge portions having smaller radial dimensions from the central area than the other peripheral edge portions. The resulting diaphragm can take many alternative forms, of which two examples are illustrated in FIGS. 3 and 4. The indents usually correspond in number to the outlets 3 and the diaphragm is arranged with the indents angularly displaced from the outlets. When only two outlets 3 are provided, as in the valve illustrated, and the diaphragm has a pair of diametrically opposed indents, the angular displacement of the indents from the outlets is through 90°.

One of the simplest forms of diaphragm is shown in FIG. 3, being of basically circular form with a pair of identical arcuate indents 10 formed symmetrically at diametrically opposed locations to provide oppositely facing concave edge portions 10a. The radius of curvature of the indents is approximately equal to that of the outer peripheral of the diaphragm.

The alternative form of diaphragm shown in FIG. 4 has cut-outs defined partly by portions 13 of a circle concentric with the outer periphery of the diaphragm and partly by a pair of diametric portions 14 of said outer periphery, the arrangement being symmetrical about the center. The working area of the diaphragm lies within the area defined by a full circle having the same center and radius as the circular portions 13.

It has been found that the diaphragm shapes illustrated in FIGS. 3 and 4, formed by removing portions of the support area 9 of the diaphragm result in a very considerable reduction in noise of operation, as compared with conventional valves. The examples provided are not, however, exhaustive and many further varieties of shape can give rise to similar noise reduction or elimination. The diaphragm need not necessarily be of modified circular form and the working area may be other than centrally located.

In the majority of practical forms of the valve of the invention of the basic shape of the diaphragm is regular, usually circular, and the shaping consists of modifying the shape of the support area 9, either during the initial formation of the diaphragm, or by removing of material from the initially shaped diaphragm.

An alternative form of the valve of the invention has an inwardly dished pressed plate in place of the additional body part 4 and the exhaust port is in the form of one or more perforations through a generally central region of the plate. The diaphragm is arranged as shown in FIG. 2 to control the exhausting of gas through the exhaust port in the manner already described.

I claim:

1. In a quick release valve comprised of: a valve body; an inlet port in said body; an exhaust port in said body; at least one outlet port in said body for connection to a working pressure line; at least one passageway in said body communicating said inlet port to each outlet port and each outlet port to said exhaust port; a freely floating flexible diaphragm in said valve body having a central portion seating against a port of said exhaust port to prevent flow of fluid from said inlet port therethrough when fluid under pressure is applied through said inlet port, and an outer portion extending into the passageway in said valve body so that when said fluid pressure from said inlet port is reduced below the fluid pressure in said outlet port, the fluid pressure from the outlet port lifts said central portion off of the seating portion of said exhaust port to allow the flow of fluid from the outlet port through the exhaust port; the improvement comprising at least one indent in said outer portion having a shape to form a cut-out peripheral section in said outer portion so that noise produced by vibration of said diaphragm during exhausting of fluid from each outlet port through said exhaust port is minimized.

2. A valve as claimed in claim 1 wherein the edge portion of said outer portion of said diaphragm engages against the interior of the valve body to support said diaphragm so that said central portion is maintained substantially centered with respect to said seating part of said exhaust port.

3. A valve as claimed in claim 1 or claim 2 wherein each indent is inwardly directed with respect to the other peripheral edge portion of the diaphragm.

4. A valve as claimed in claim 3 wherein each indent forms an arcuate concave peripheral edge portion.

5. A valve according to claim 1, 2 or 3, wherein each indent of the diaphragm has an arcuate shape.

6. A valve as claimed in claim 5 wherein the ends of said arcuate shaped indent form radially directed peripheral edge portions with respect to the central portion.

7. A valve according to claim 3 wherein a pair of diametrically opposed indents are provided.

8. A valve according to claim 7, wherein said indents are identical.

9. A valve according to claim 8, wherein the valve has a pair of opposed outlets for connection to respective brake actuators and said indents are angularly displaced from the outlets.

10. A valve according to claim 9 wherein said indents are symmetrical and said displacement is 90° with respect to the geometric center of said indents.

11. A valve as claimed in claim 10 wherein each indent forms an arcuate peripheral edge portion.

* * * * *